US009572202B2

(12) United States Patent
Viroli et al.

(10) Patent No.: US 9,572,202 B2
(45) Date of Patent: Feb. 14, 2017

(54) INDUCTION GENERATOR FOR INDUCTION HEATING DEVICES AND A METHOD FOR THE OPERATION OF AN INDUCTION GENERATOR FOR INDUCTION HEATING ELEMENTS

(75) Inventors: Alex Viroli, Forli (IT); Andrea Rossi, Forli (IT); Laurent Jeanneteau, Forli (IT); Luca Zannoni, Forli (IT)

(73) Assignee: ELECTROLUX HOME PRODUCTS CORPORATION N.V., Brussels (BE)

(*) Notice: Subject to any disclaimer, the term of this patent is extended or adjusted under 35 U.S.C. 154(b) by 396 days.

(21) Appl. No.: 14/236,058

(22) PCT Filed: Sep. 12, 2012

(86) PCT No.: PCT/EP2012/067761

§ 371 (c)(1), (2), (4) Date: Jun. 4, 2014

(87) PCT Pub. No.: WO2013/037791

PCT Pub. Date: Mar. 21, 2013

(65) Prior Publication Data

US 2014/0319127 A1 Oct. 30, 2014

(30) Foreign Application Priority Data

Sep. 15, 2011 (EP) .................................... 11181427

(51) Int. Cl.
*H05B 6/06* (2006.01)
*H05B 6/12* (2006.01)
*H02M 1/12* (2006.01)

(52) U.S. Cl.
CPC .............. *H05B 6/065* (2013.01); *H05B 6/062* (2013.01); *H05B 2213/05* (2013.01)

(58) Field of Classification Search
CPC ...... H05B 6/062; H05B 6/065; H05B 2213/05
(Continued)

(56) References Cited

U.S. PATENT DOCUMENTS 6,141,227 A * 10/2000 Sheikh .................... H02M 1/12 363/37
6,737,617 B1 5/2004 Daum et al.
(Continued)

FOREIGN PATENT DOCUMENTS

EP 1255421 11/2002
EP 2224787 9/2010

OTHER PUBLICATIONS

International Search Report for PCT/EP2012/067761, dated Nov. 30, 2012, 3 pages.

*Primary Examiner* — Quang Van
(74) *Attorney, Agent, or Firm* — Pearne & Gordon LLP

(57) ABSTRACT

An induction generator is connected to a three-phase mains. The induction generator includes a control unit (10) connected to a current transformer (38), on one (L1) of the lines (L1, L2, L3) of the three-phase mains. The induction generator includes a number of power sections (26, 28, 30, 32, 34, 36). Each power section (26, 28, 30, 32, 34, 36) supplies one of the induction coils (40, 42, 44, 46, 48, 50). A control unit (10) estimates and corrects harmonic distortions of the mains current via the current transformer (38). The power transferred to a heated object as a function of the frequency is stored in a memory of the control unit (10), so that the heated object is identifiable by its frequency-power characteristic. The frequency spectrum of the transferred power related to a harmonic distortion in the line (L1) is stored in the memory (10) if the distortion exceeds a predetermined limit. The harmonic distortions are corrected by the control unit (10) if a heated object with the frequency-power characteristic related to the harmonic distortion is detected.

13 Claims, 1 Drawing Sheet

(58) Field of Classification Search
USPC ............... 219/620, 621, 622, 623, 625, 626, 627,219/661, 662, 663, 665, 667, 671, 518; 363/34, 363/37, 40, 41, 132; 324/239, 243
See application file for complete search history.

(56) References Cited

U.S. PATENT DOCUMENTS

| | | | | |
|---|---|---|---|---|
| 2009/0065502 | A1* | 3/2009 | Suenaga ................ | H05B 6/685 219/716 |
| 2013/0037535 | A1* | 2/2013 | Ogasawara ............ | H05B 6/062 219/622 |

* cited by examiner

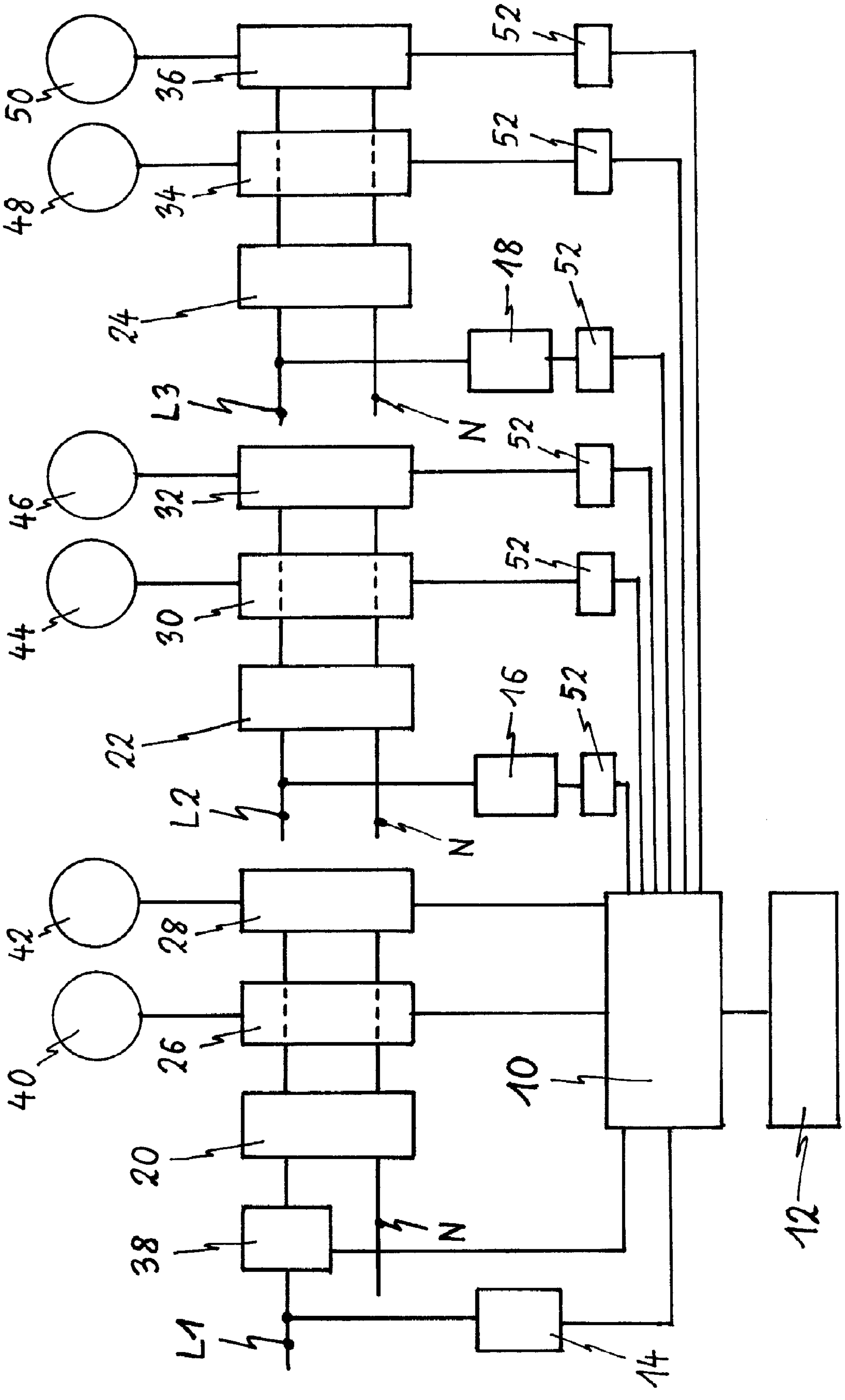
50
36
52
48
34
52
24
18
52
L3
N
46
32
52
44
30
52
22
16
52
L2
N
42
28
40
26
10
20
38
N
12
L1
14

INDUCTION GENERATOR FOR INDUCTION HEATING DEVICES AND A METHOD FOR THE OPERATION OF AN INDUCTION GENERATOR FOR INDUCTION HEATING ELEMENTS

The present invention relates to an induction generator for induction heating elements, in particular for induction coils of a cooking hob. Further, the present invention relates to a method for the operation of an induction generator for induction heating elements, in particular for induction coils of a cooking hob. Moreover, the present invention relates to an induction cooking hob.

Typically, for some countries like Germany, an induction generator for induction heating elements is supplied by different lines from a three-phase-system. The induction generator includes at least one rectifier, one or more power sections and a control section for each line. Further, the induction generator requires a correction or reduction of harmonic distortions of the mains current.

It is an object of the present invention to provide an induction generator for induction heating elements supplied by different lines from a three-phase-system, wherein the induction generator allows a correction or reduction of harmonic distortions and is realized by low complexity.

The present invention relates to an induction generator for induction heating elements, in particular for induction coils of a cooking hob, wherein:

- the induction generator is connected or connectable to different lines of a three-phase mains,
- the induction generator includes a control unit supplied by a power supply connected to one line of the three-phase mains via a current transformer,
- the control unit is connected to a current transformer via an adaption circuit in order to detect the current of said one line of the three-phase mains,
- the induction generator includes a number of power sections,
- each power section is provided for supplying one of the induction heating elements,
- the control unit is provided for estimating and correcting harmonic distortions of the mains current,
- the power transferred to a heated object as a function of the frequency is stored or storable in a memory of the control unit, so that the heated object is identifiable by its frequency-power characteristic,
- the frequency spectrum of the transferred power related to an harmonic distortion in the line supplying the control unit is stored or storable in the memory of the control unit, if said harmonic distortion exceeds a predetermined limit, and
- the harmonic distortions of the mains current are corrected or correctable by the control unit, if the heated object with the frequency spectrum related to the harmonic distortion is detected.

The main idea of the present invention is that the correction or a reduction of the harmonic distortions is activated, when the heated object with a specific frequency-power characteristic is detected. Only one control unit for all three lines of the three-phase mains is required.

In particular, the induction generator includes a number of detection devices, wherein each detection device is connected to or associated with one line of the three-phase mains. For example, the amplitude, frequency and zero crossing are measured be the detection devices.

Further, the induction generator includes a number of rectifiers, wherein each rectifier is connected to or associated with one line of the three-phase mains.

Preferably, the control unit is directly connected to that detection device and those power sections associated with the line supplying the control unit.

In contrast, the control unit is connected via galvanic insulation means to those detection devices and power sections associated with those lines of the three-phase mains, which are not supplying the control unit.

In particular, the power transferred to the heated object as a function of the frequency is stored or storable as a table in the memory of the control unit.

For example, the heated object is a pot or a pan heated by the heating elements, in particular by the induction coils.

The present invention relates to a method for operating an induction generator for induction heating elements, in particular for induction coils of a cooking hob, said induction generator is connected to different lines of a three-phase mains and includes a control unit supplied by one line of the three-phase mains via a power supply, said control unit is connected to a current transformer in order to detect the current of the one line of the three-phase mains, and a number of power sections, each power section is provided for supplying one of the induction heating elements, wherein the method comprises the steps of:

- estimating harmonic distortions of the mains current by the control unit via the current transformer,
- storing the power transferred to a heated object as a function of the frequency in a memory of the control unit, so that the heated object is identifiable by its frequency-power characteristic,
- storing the frequency spectrum of the transferred power related to an harmonic distortion in the line supplying the control unit in the memory of the control unit, if said harmonic distortion exceeds a predetermined limit, and
- correcting the harmonic distortions of the mains current by the control unit, if the heated object with the frequency spectrum related to the harmonic distortion is detected.

The core of the inventive method is activation of the correction or reduction of the harmonic distortions, when the heated object with a specific frequency spectrum is detected. Only one current transformer for all three lines of the three-phase mains is required.

Further, the current of each line of the three-phase mains is detected by a separate detection device in each case.

In a similar way, the current of each line of the three-phase mains is rectified by a separate rectifier in each case.

In particular, the power transferred to the heated object as a function of the frequency is stored as a table in the memory of the control unit.

For example, the heated object is a pot or a pan heated by the heating elements, in particular by the induction coils.

Further, the present invention relates to an induction cooking hob with a number of induction heating elements, in particular induction coils, wherein the induction cooking hob comprises at least one induction generator mentioned above.

At last, the present invention relates to an induction cooking hob with a number of induction heating elements, in particular induction coils, wherein the induction cooking hob is provided for a method described above.

Novel and inventive features of the present invention are set forth in the appended claims.

The present invention will be described in further detail with reference to the drawing, in which FIG. 1 illustrates a schematic circuit diagram of an induction generator for induction heating elements according to a preferred embodiment of the present invention.

FIG. 1 illustrates a schematic circuit diagram of an induction generator for induction heating elements according to a preferred embodiment of the present invention. In this embodiment, the induction heating elements are induction coils 40, 42, 44, 46, 48 and 50 provided for cooking zones of an induction cooking hob.

The induction generator includes a control unit 10, a user interface 12, three detection devices 14, 16 and 18, three rectifiers 20, 22 and 24, six power sections 26, 28, 30, 32, 34 and 36, and a current transformer 38. For example, the power sections 26, 28, 30, 32, 34 and 36 are half-bridge inverters.

The control unit 10 is connected to the user interface 12. The user interface 12 is handled by the user and sends signals to the control unit 10. Said signals correspond with adjustments of the user interface 12 by the user. The control unit 10 is connected to the current transformer 38 placed on a first line L1 of a three-phase mains.

The first detection device 14 is connected to the first line L1 of the three-phase mains. In a similar way, the second detection device 16 is connected to a second line L2 of the three-phase mains. Further, the third detection device 18 is connected to a third line L3 of the three-phase mains. The detection devices 14, 16 and 18 are provided for detecting characteristic parameters, e.g. amplitudes, frequencies and zero crossings, of the voltages at the lines L1, L2 and L3, respectively. The detection devices 14, 16 and 18 are connected to the control unit 10.

An input side of the first rectifier 20 is connected the first line L1 and a neutral line N. In a similar way, an input side of the second rectifier 22 is connected to the second line L2 and the neutral line N. Further, an input side of the third rectifier 24 is connected to the third line L3 and the neutral line.

An output side of the first rectifier 20 is connected to input sides of the first power section 26 and the second power section 28. In a similar way, an output side of the second rectifier 22 is connected to input sides of the third power section 30 and the fourth power section 32. Further, an output side of the third rectifier 24 is connected to input sides of the fifth power section 34 and the sixth power section 36. A control input of each power section 26, 28, 30, 32, 34 and 36 is connected to the control unit 10. An output of each power section 26, 28, 30, 32, 34 and 36 is connected to the corresponding induction coil 40, 42, 44, 46, 48 and 50, respectively.

The control unit 10, which is supplied by the first line L1, is directly connected to the first detection device 14 and the first and second power sections 26 and 28. The first detection device 14 and the first and second power sections 26 and 28 are also supplied by the first line L1. In contrast, between the control unit 10 on the one hand and the second and third detection devices 16 and 18 and the third to sixth power sections 30, 32, 34 and 36 on the other hand there are galvanic insulation means 52.

The current transformer 38 is connected to the first line L1 of the three-phase mains. The current transformer 38 allows that the control unit 10 estimates the harmonic distortion of the mains current. Further, the current transformer 38 allows that the control unit 10 applies correction means to the power sections 26, 28, 30, 32, 34 and/or 36 in order to reduce the distortion. The control unit 10 recognizes a deviation or distortion of the actual shape or frequency spectrum of the supply current of rectified current from a predetermined admissible shape or frequency spectrum lying outside of a predetermined tolerance range. The induction current or the electric power associated with the induction current is adapted by the control unit 10 until the detected deviation or distortion of the actual shape or frequency spectrum of the supply current of the rectified current from the predetermined admissible shape or frequency spectrum lies within the predetermined tolerance range again.

The characteristic of the power transferred to the pot as a function of the frequency of the induction generator is stored in a memory of the control unit 10. For example, the power as function of the frequency is stored as a table for several kinds of pot. When the power as function of the frequency is detected by the control unit 10, via the detection device 14, 16 or 18, then the control unit 10 automatically identifies the type of pot, which is used. Then, the control unit 10 reduces the harmonic distortions caused by said pot.

If the harmonic distortion in the first line L1 detected by the first detection device 14 exceeds predetermined limits, then the control unit 10 stores the related power as function of the frequency in its memory. The control unit 10 applies a harmonic distortion reduction technique to the first line L1.

For example, the harmonic distortion reduction technique is performed by a dynamic wave form correction, wherein a frequency converter rectifies the input power signal into a half wave signal, in particular a half wave voltage signal. The half wave signal is delimited by two subsequent zero crossings. A half wave duration is defined by the time lag between said zero crossings. The frequency converter converts the half wave signal into a working signal, in particular a working current signal for supplying the induction heating device. A working frequency of the working signal is first increased from a first base frequency to a maximum frequency. Then the working frequency is decreased to a second base frequency within a time smaller than the half wave duration. The first base frequency and the second base frequency are different from each other.

The control unit 10 applies the harmonic distortion reduction technique, if said control unit 10 recognize a known pattern of the power as function of the frequency, also to the second line L2 and to the third line L3. The second line L2 and the third line L3 are not provided with a current transformer.

The induction generator according to the present invention is able to control more than one induction coil 40, 42, 44, 46, 48 or 50 by the one control unit 10 only. The power sections 26, 28, 30, 32, 34 and 36 can be connected to different lines L1, L2 or L3 of the three-phase mains.

LIST OF REFERENCE NUMERALS

10 control unit
12 user interface
14 first detection device
16 second detection device
18 third detection device
20 first rectifier
22 second rectifier
24 third rectifier
26 first power section
28 second power section
30 third power section
32 fourth power section
34 fifth power section
36 sixth power section

38 current transformer
40 first induction coil
42 second induction coil
44 third induction coil
46 fourth induction coil
48 fifth induction coil
50 sixth induction coil
52 galvanic insulation means
L1 first line
L2 second line
L3 third line
N neutral line

The invention claimed is:

1. An induction generator for for induction coils of a cooking hob, wherein:

the induction generator is connected or connectable to different lines (LI, L2, L3) of a three-phase mains, the induction generator includes a control unit (10) connected to a current transformer (38) placed on one line (LI) of the three-phase mains, the induction generator includes a number of power sections (26, 28, 30, 32, 34, 36), each power section (26, 28, 30, 32, 34, 36) is provided for supplying one of the induction heating elements (40, 42, 44, 46, 48, 50), the control unit (10) is provided for estimating via the current transformer (38) and correcting harmonic distortions of the mains current, the power transferred to a heated object as a function of the frequency is stored or storable in a memory of the control unit (10), so that the heated object is identifiable by its frequency-power characteristic, the frequency spectrum of the transferred power related to an harmonic distortion in the line (LI) supplying the control unit is stored or storable in the memory of the control unit (10), if said harmonic distortion exceeds a predetermined limit, and the harmonic distortions of the mains current are corrected or correctable by the control unit (10), if the heated object with the frequency-power characteristic related to the harmonic distortion is detected.

2. The induction generator according to claim 1, wherein the induction generator includes a number of detection devices (14, 16, 18), wherein each detection device (14, 16, 18) is connected to or associated with one line (LI, L2, L3) of the three-phase mains.

3. The induction generator according to claim 1, wherein the induction generator includes a number of rectifiers (20, 22, 24), wherein each rectifier (20, 22, 24) is connected to or associated with one line (LI, L2, L3) of the three-phase mains.

4. The induction generator according to claim 1, wherein the control unit (10) is directly connected to that detection device (14) and those power sections (26, 28) associated with the line (LI) supplying the control unit (10).

5. The induction generator according to claim 1, wherein the control unit (10) is connected via galvanic insulation means (52) to those detection devices (16, 18) and power sections (30, 32, 34, 36) associated with those lines (L2, L3) of the three-phase mains, which are not supplying the control unit (10).

6. The induction generator according to claim 1, wherein the power transferred to the heated object as a function of the frequency is stored or storable as a table in the memory of the control unit (10).

7. The induction generator according to claim 1, wherein the heated object is a pot or a pan heated by the induction coils.

8. A method for operating an induction generator for induction coils of a cooking hob, said induction generator is connected to different lines (LI, L2, L3) of a three-phase mains and includes a control unit (10) supplied by one line (LI) of the three-phase mains via a power supply, said control unit (10) is connected to a current transformer (38) in order to detect the current of the one line (LI) of the three-phase mains, and a number of power sections (26, 28, 30, 32, 34, 36), each power section (26, 28, 30, 32, 34, 36) is provided for supplying one of the induction heating elements (40, 42, 44, 46, 48, 50), wherein the method comprises the steps of:

estimating harmonic distortions of the mains current by the control unit (10) via the current transformer (38), storing the power transferred to a heated object as a function of the frequency in a memory of the control unit (10), so that the heated object is identifiable by its frequency spectrum, storing the frequency spectrum of the transferred power related to an harmonic distortion in the line (LI) supplying the control unit in the memory of the control unit (10), if said harmonic distortion exceeds a predetermined limit, and correcting the harmonic distortions of the mains current by the control unit (10), if the heated object with the frequency spectrum related to the harmonic distortion is detected.

9. The method according to claim 8, wherein the current of each line (LI, L2, L3) of the three-phase mains is detected by a separate detection device (14, 16, 18) in each case.

10. The method according to claim 8, wherein the current of each line (LI, L2, L3) of the three-phase mains is rectified by a separate rectifier (20, 22, 24) in each case.

11. The method according to claim 8, wherein the power transferred to the heated object as a function of the frequency is stored as a table in the memory of the control unit (10).

12. The method according to claim 8, wherein the heated object is a pot or a pan heated by the induction coils.

13. An induction cooking hob with a number of induction coils, wherein the induction cooking hob comprises at least one induction generator according to claim 1.

* * * * *